Aug. 7, 1951

J. MULLER
AUTOMATIC VALVE SYSTEM FOR FILLING
AND EMPTYING LIQUID TANKS

Filed April 22, 1949

Inventor
JACQUES MULLER
By: Young, Emery & Thompson
Attys.

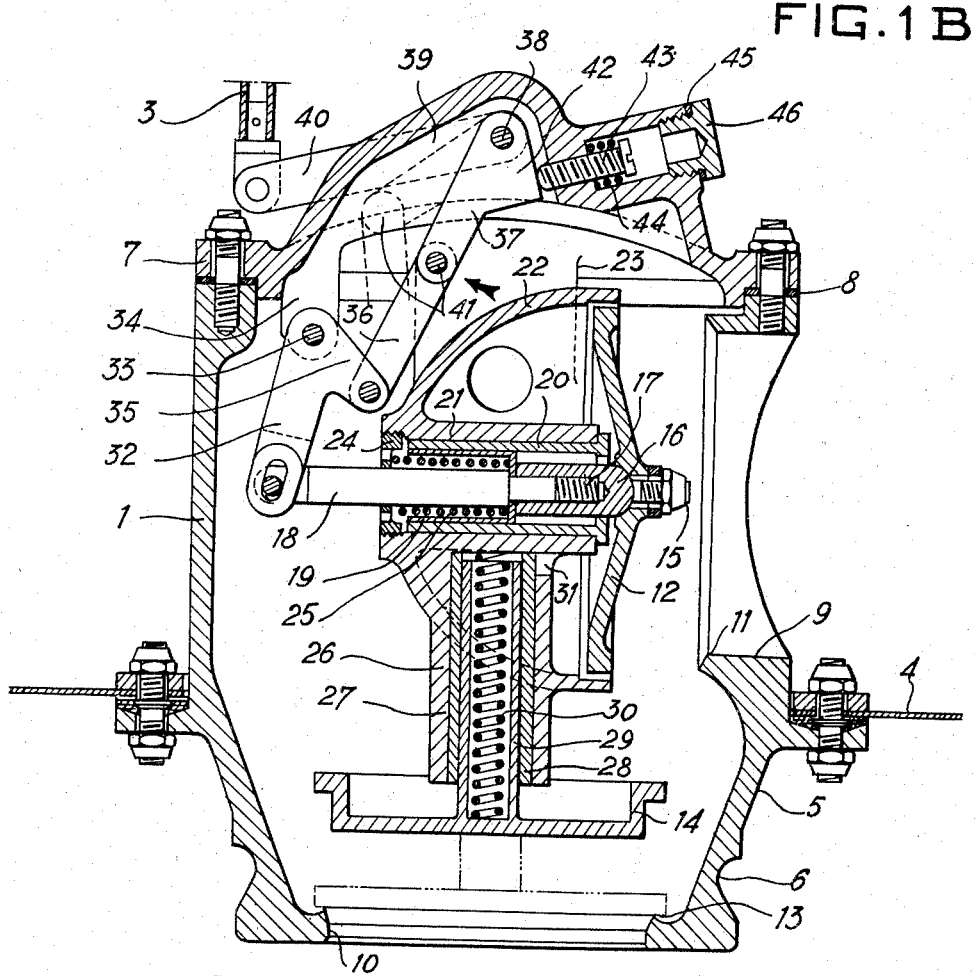
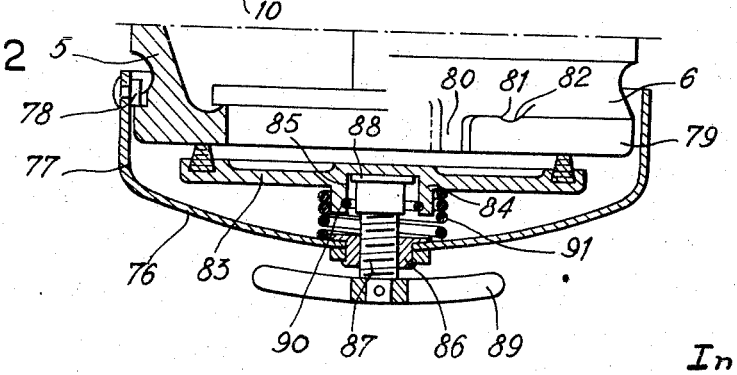

Patented Aug. 7, 1951

2,563,481

UNITED STATES PATENT OFFICE 2,563,481

AUTOMATIC VALVE SYSTEM FOR FILLING AND EMPTYING LIQUID TANKS

Jacques Muller, La Garenne Colombes, France

Application April 22, 1949, Serial No. 88,937
In France May 12, 1948

11 Claims. (Cl. 137—68)

The present invention relates to an automatic valve system for filling and emptying liquid tanks, and more particularly for filling under pressure through the bottom or the sides, or eventually through all sides.

The object of the invention is to provide a valve system stopping automatically the supply of liquid as soon as it reaches the desired level in the tank, insuring the escape of the air during filling, allowing the ventilation when necessary, preventing the burst of the tank by allowing the escape of the surplus of the liquid and its draining in case of non-operation of the valve system, and comprising a valve for automatically closing the air escape hole when turning a machine on its back, as for instance a tank mounted on an aircraft for acrobatics.

To this effect, the automatic valve system of this invention comprises a valve box encased from below in the bottom or a side wall of the tank and provided with a nozzle for securing a coupling device of a pipe, and a float box encased from above in the top or a side wall of the tank, the valve box containing an automatic valve for closing the bore of the nozzle from inside to outside, and a valve controlled by means of one of the floats of the float box for closing for instance a lateral hole of the valve box, which is in communication with the inside of the tank.

In the top of the float box is provided an aperture which is controlled by a safety valve automatically closed by means of springs and which opens automatically under the action of the liquid pressure in case of non-operation of the valve system.

The float box contains a second bell-shaped float having an aperture in the lower part, connected to a valve allowing the ventilation, that is the communication with the outer air in the normal position of the tank, and closing the air escape aperture in case of tilting or turning the tank on its back, for preventing all loss of liquid and allowing at the same time the ventilation through reduced pressure.

Other features of the invention will appear from the following detailed description with reference to the accompanying drawing, on which:

Figs. 1A and 1B are axial sectional views respectively of the upper and lower part of the valve system;

Fig. 2 is a sectional view of a detail, certain parts being shown in side elevation.

Figure 1A:
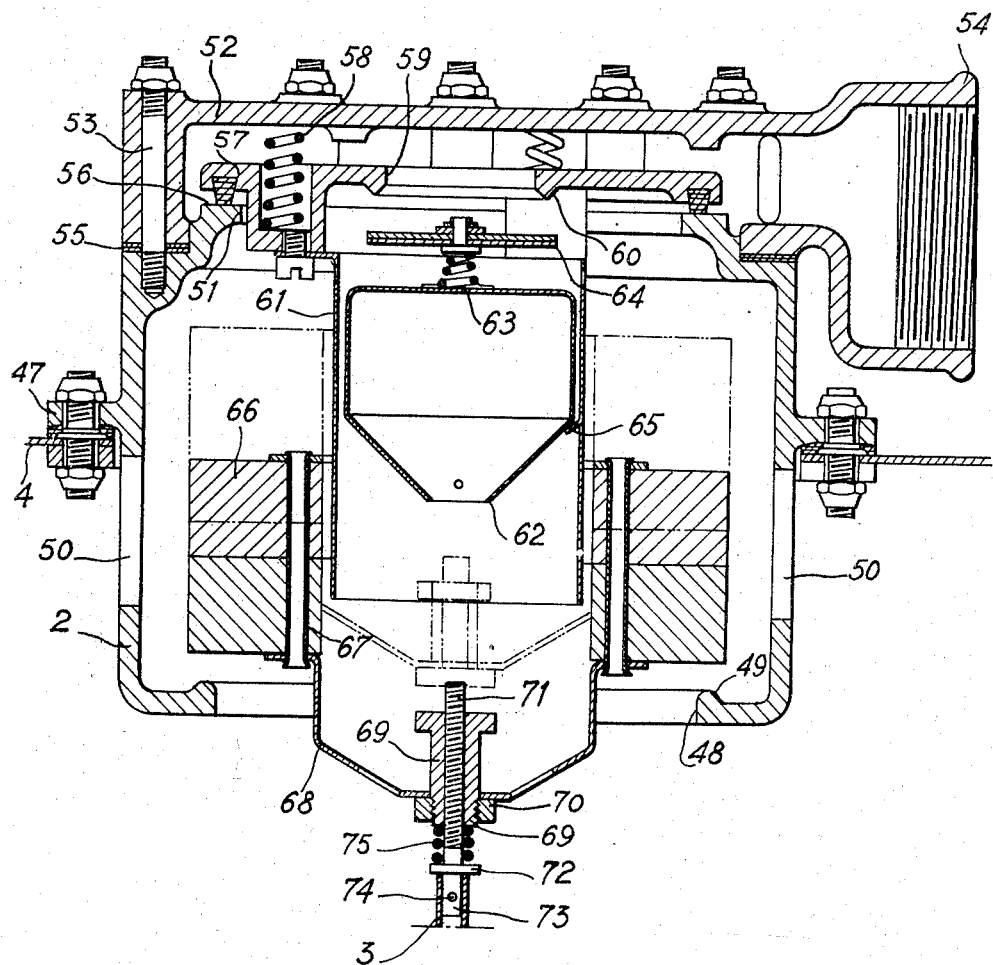

This valve system comprises a valve box 1 and a float box 2, connected to the first through a control rod or tube 3. In the example shown on the drawing, the valve box is mounted from below in an opening cut in the bottom of the tank 4, whereas the float box is mounted from above in another opening cut in the top of this tank. The valve box is extended downwardly and to the outside of the tank by a nozzle 5 for filling and emptying, in the periphery of which is cut near the end a groove 6 adapted to receive the tightening chuck of a coupler (not represented), such as described for instance in applicant's pending application Ser. No. 88,938 filed April 22, 1949, for: "Improvements in or Relating to Couplers, Particularly for the Rapid and Fluid-tight Coupling of Pipes With Tank Nozzles and the Like."

The upper part of this valve box is closed by a cover 7, attached on the body by bolts, and the tightness of which is insured by a packing 8. The box has a side hole 9 in communication with the inside of the tank and connecting this to the hole 10 of the nozzle 5. The inner edge of the hole 9 is surrounded by a circular seat 11 for the valve 12. The hole 10 of the nozzle is surrounded at the inside by a seat 13 for the valve 14. The valve 12 engages with a central bore the screw-threaded stud 15 of a plunger 16, and is pressed by means of a nut against the spherical end of this plunger, which is screwed on a screw-threaded extension 17 of a rod 18. Between the plunger 16 and a shoulder of the rod 18 is tightened the bottom of a hollow piston 19 slidingly mounted in a horizontal cylinder 20 concentric to the axis of the seat 11, and encased in a central boss 21 extending from the bottom inside of a half-spherical bell 22, which is connected to the cover 7 by an arm 23. The open side of the bell 22 is turned towards the seat 11. The plunger 16 is axially guided in a circular bore provided in the bottom of the cylinder 20, a peripheral flange of which fits against the free end of the boss 21. In the other end of this boss, which opens at the outside of the bell 22, is screwed a cup 24 surrounding the rod 18 with a certain clearance and in which are bored holes. Between the cup 24 and the bottom of the piston 19 is interposed a compression spring 25. It will be seen that this spring has the tendency to push to the right side, that is in the direction of the seat 11, the whole of the piston 19, the rod 18, the plunger 16 and the valve 12. For allowing the movement of the piston from left to right, it is necessary to bore a leakage hole in the bottom of the cylinder 20. But this leakage hole must be sufficiently small for retarding the movement of the valve and for damping the blow of this valve against its seat 11. In fact, the spring 25 is only adapted to start the closing movement of the valve 12 which is then carried away by the flow of the liquid entering the tank through the hole 9 during the filling period. Now, this flow has the tendency to apply the valve violently against its seat, and this tendency must be counter-acted by means of the leakage hole. The bell 22 is extended to a predetermined distance from the seat 11 and the diameter of its opening is so chosen that the valve 12 can engage this opening when it is completely open, to be hidden and protected against the flow of the liquid entering the tank during the filling period.

The axial boss 21 of the bell is integral with a radial boss 26 in which is provided a bore 27 concentric to the axis of the hole 10 of the nozzle 5. In this bore is encased a sheath 28 in which is slidingly mounted the hollow rod 29 of the valve 14. Between this valve and the bottom of the bore 27 is interposed a compression spring 30 which has the tendency to press the valve against the seat 13. The bottom of the bore 27 is in communication with the inside of the bell 22 through a lateral hole 31 allowing the escape of the fluid during the compression of the spring 30.

The end of the rod 18, which is remote from the valve 12, is linked to the descending arm 32 of a bell-crank lever pivoted on a stud 33 secured to a carrier 34 integral with the cover 7. The other arm 35 of the bell-crank lever, which is directed downwards and towards the axis of the valve box 1, is linked to one end of a link 36, the other end of which is linked to the free end of a lever 37 secured to a stub shaft 38 which is parallel to the stud 33 and rotatively mounted in another carrier 39 of the cover 7. The stub shaft 38 is extended to the outside of the cover 7 and carries a lever 40 which is linked to the lower end of the rod 3. The link 36 forms with the lever 37 a toggle joint which breaks in the direction of the arrow during the closing movement of the valve 12, but which is straightened in the reverse direction during the opening movement of the valve 12. The arrangement is such that the common joint 41 between the link 36 and the lever 37 passes then very slightly beyond the dead point, and that the whole device holds the valve at the open position shown on the drawing, against the action of the spring 25 and of the liquid flow when filling the tank. To this effect, the lever bears against a stop through a shoulder 42. In the example represented on the drawing, this stop is formed by an adjustable screw 43, screwed from the outside into the wall of the cover 7, and the end of which projects inside the cover. Between the head of the screw 43 and the wall of the cover is interposed a compression spring 44 which holds the screw stationary in the setting position. The outer part of the screw is protected in a recess bored in a boss 45 of the cover and closed by a screwed plug 46.

The float box 2 is inserted from above in the opening provided to this effect in the top of the tank 4, and rests on this top through an outer flange 47 placed at an intermediate level of its height, so that a part of the box projects downwards inside the tank, whereas another part projects above this tank. In the bottom of the box is provided a circular aperture 48 surrounded at the inside by a seat 49 and connecting the inside of the tank to the inside of the box. Other apertures 50 for communication are cut in the side wall of the box. In the upper plane wall of this box is provided another circular aperture 51, concentric to the axis of the aperture 48. On the top of the box is placed a flat cover 52, which is attached by bolts 53 and has a lateral nozzle 54 for connection to any suitable pipe. The fluid-tightness of the cover is insured by a packing 55.

The upper plane face of the wall, in which is provided the aperture 51, forms a seat 56 for a safety valve 57 which is pressed on this seat through a circular series of compression springs 58, inserted between the valve and the cover 52. The safety valve 57 presents itself a central aperture 59 surrounded on the inner side by a seat 60. On the lower face of this valve 57 is secured by means of screws a cylindrical pit 61 having holes, which is concentric with the common axis of the apertures 48, 51 and 59, and in which is freely guided a bell-shaped float 62, having an opening in the lower part. On the top of this float, a spring holder 63 carries at its free end a valve 64 adapted to be pressed against the seat 60. The float can freely move inside the pit 61 between two limits, one of which is determined by the seat 60 and the other of which is determined by stops 65, spaced around the inner side of the pit 61.

In the space between the pit 61 and the peripheral wall of the box 2 is arranged an annular float 66, formed by a stack of cork discs assembled by axial rivets 67. This float can freely move on the pit 61 and it is axially guided by this pit. The rivets 67 serve also to secure a strap 68 on the lower face of the float 66.

In the bridge-part and at the center of this strap is pierced a hole which is freely engaged from above by the cylindrical body of a nut 69, the upper end of which has a hexagonal operating head, whereas the lower end is screwed into another nut 70, the arrangement being such that the whole can move in the hole. The nut 69 is at turn screwed on a screw-threaded rod 71 which presents at a certain distance below the nut 70 a collar 72 downwardly extended by a shank 73 engaging the upper end of the tube 3, and coupled to this tube by a pin 74. Between the collar 72 and the nut 69 is interposed a compression spring 75. The object of this device is to allow the adjustment of the length of the rod or tube 3, and of the starting position of the float 66 with regard to the position in which the valve 12 is completely open. The spring 75 is provided to block the nut 69 with regard to the screw-threaded rod 71.

The operation of this whole device is as follows:
Supposing the tank 4 is empty. The float 66, not resting on a liquid, is at its lowest position.

The control rod 3 is therefore completely lowered and acts through the lever 40 and the stub shaft 38 on the lever 37, the shoulder 42 of which rests against the stop 43. This stop is so adjusted that the common joint 41 between the lever 37 and the link 36 is pushed beyond the dead point. The proportions of the bell-crank lever 32, 35 are so chosen that the valve 12 is completely open. Under the action of the weight of the whole of the connecting mechanism acting on the piston 19, the spring 25 is compressed and held in this position through the toggle joint 36, 37, the common joint of which has passed the dead point and which cannot be broken through a thrust arising from the valve 12.

Of course, the aperture 10 of the nozzle 5 is closed, inasmuch as the valve 14 is pressed against its seat 13 through the spring 30.

For filling the tank 4, it is necessary to engage the nozzle 5 by a coupler equipped with a closing device and connected through a hose-pipe to a source of liquid which is elevated or under pressure. After opening the closing device of the coupler, the liquid under pressure pushes back the valve 14 against the action of its spring 30, enters the valve box 1 and then the tank 4 through the aperture 9. During the filling period, the air can escape through the aperture 59 of the safety valve 57, and this aperture allows in this manner the ventilation. The liquid acts on none of the other members of the apparatus according to the invention as long as the level of this liquid has not reached the float 66. The position of this float is adjusted in such a manner that it is lifted by the liquid when the tank is almost full. The result is a clockwise movement of the lever 40, and the common joint 41 is brought back inside the dead point, so that the toggle joint 36, 37, is broken, and that the spring 25 can start the closing movement of the valve 12, to push it out of its housing formed by the bell 22. As soon as the valve 12 is exposed to the flow of the liquid entering the tank through the aperture 9, this flow has the tendency to carry said valve away in the closing direction. The action of this flow is sufficient to overcome the resistance of the mechanism. But the displacement of the piston 19 from left to right in the cylinder 20 is counteracted by the fact that the liquid, which had the time to enter the annular interval between the cylinder 20 and the plunger 16 during filling of the tank, can only escape slowly through the leakage hole provided to this effect. The result is that the valve 12 closes gradually and is gently pressed against its seat 11. This gradual closing movement of the valve 12 prevents water-ram effects in the valve box 1, in the coupler and in the pipes.

As soon as the valve 12 is closed, the liquid stops flowing and exerts no longer its pressure on the valve 14, which can then be closed under the action of its spring 30. It is then possible to remove the coupler.

During filling, the air contained in the tank escapes through the ventilating aperture 59 provided in the valve 57.

In case of accidental non-operation of the valve system, the rising liquid lifting the bell-shaped float 62 presses its valve 64 against the seat 60. The pressure rises in the tank and lifts the safety valve 57, which leaves its seat 56 against the action of the springs 58.

The air or the excess of liquid escapes through the opening 51 and is returned through the nozzle 54 to a recovering vessel.

For emptying the tank, it is necessary to use a coupler equipped with a device allowing to push and open the valve 14 for the passage of the liquid, this coupler being of the type described for instance in the copending application mentioned above. If the liquid level inside of the tank is still sufficient to hold the float 66 above the lowest position, the pressure of the liquid acting on the inner face of the valve 12 can be sufficient to open it slightly and to lower gradually the float. As fast as the tank is emptied through the two apertures 9 and 10, the float 66 goes down to the lowest position, and the valve 12 opens more and more until it engages finally its housing in the bell 22. In this position of the members, the toggle joint 36, 37 is straightened, with the common joint 41 again pushed beyond the dead point.

During the new filling, the operation of the different members occurs again in the above described manner.

It is necessary to cover the mouth of the nozzle 5 between the filling or emptying operations, to protect it against dirt and to shield it against damage.

To this effect, one uses a cap like that shown on Fig. 2. This cap has the shape of a crown 76, made of stamped metal, joined to a cylindrical skirt 77 having at the inside studs 78 directed radially and spaced around the periphery. In the peripheral flange 79 at the end of the nozzle 5 are cut longitudinal slots 80 in a number equal to that of the studs 78, and the bottom of the groove 6 is cut away to form lateral grooves 81 starting from the slots 80 and merging each into a notch 82 cut in the inner side of the flange 79. In this manner is obtained a one-turn closing cap, so that it is sufficient to engage the mouth of the nozzle with the cap by passing the studs 78 in the slots 80, and to turn the cap in the suitable direction until the studs engage the notches.

The cap serves also to insure the perfectly tight closure of the nozzle 5. To this effect, one uses a valve 83 having on the outer face a central boss 84 in which is provided a cylindrical recess 85. In a central hole of the cap is riveted a nut 86 in which is screwed from inside to outside a screw-threaded stud 87 having a head 88. On the end of the screw-threaded stud, which projects at the outside of the cap, is secured in any suitable manner a handle 89, by means of which it is possible to rotate the screw-threaded stud. The head 88 is inserted in the cylindrical recess 85 of the valve, and retained in this recess by a split ring 90. Between the valve and the bottom of the cap is inserted a compression spring 91.

At rest, the valve 83 is pushed towards the opening of the cap by the spring 91, but it is retained by the ring 90 against which abuts the head 88 of the screw-threaded stud 87. The arrangement is such that the valve 83 is pressed against the end of the nozzle 5 as soon as the studs 78 engage the notches 82. After securing the cap, one rotates the handle 89 to screw it, for strongly pressing the valve 83 against the nozzle. This tightening locks also the cap.

It is to be understood that the invention is not limited to the embodiment which has been described only as an example with reference to the drawing. Without departing from the principles, it is possible to devise variations, modifications or complements of details, particularly for an auxiliary control of the closing operation of the valve 12, in view of the separation of one or more tanks in the event of connection of their valve system through a common filling or emptying pipe.

What I claim is:

1. An automatic valve system for filling and emptying liquid tanks, comprising in combination, a valve box encased from below in the bottom of a tank, a coupling nozzle on this box projecting to the outside of the tank, a lateral orifice in this box communicating with the inside of the tank, a valve in the box adapted to close from inside to outside the opening of the nozzle, means for closing automatically this valve, a second valve in said box adapted to control said lateral orifice, a float box encased from above in the top of the tank, a float in this float box arranged to be actuated by the liquid, and means between this float and the valve of said lateral orifice to close said valve when the float is lifted by the liquid, and to open said valve when the float goes down.

2. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in said valve box adapted to control said lateral orifice, a float box encased from above in the top of the tank, a float in this float box arranged to be actuated by the liquid, means between this float and said valve to close this valve when the float is lifted by the liquid, and to open said valve when the float goes down, a safety valve arranged to seat on the top of the float box and to close an orifice provided in this top, and means to press said safety valve against the top of the box.

3. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in said valve box adapted to control said lateral orifice, a float box encased from above in the top of the tank, a float in this float box arranged to be actuated by the liquid, means between this float and said valve to close this valve when the float is lifted by the liquid, and to open said valve when the float goes down, a safety valve arranged to seat on the top of the float box and to close an orifice provided in this top, a second float in said float box, a ventilating valve arranged to close a ventilating orifice provided in said safety valve, and means to connect said ventilating valve to said second float.

4. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in said valve box adapted to control said lateral orifice, a float box encased from above in the top of the tank, a float in this float box arranged to be actuated by the liquid, a central rod secured to said valve, a stationary guide in the valve box coaxial with said lateral orifice and in which said rod is slidingly mounted, a crank lever pivoting about a fixed point in the upper part of the valve box, and one arm of which is linked to said rod, a toggle joint one end of which is linked to the other arm of the crank lever, a stub shaft rotatively mounted in the upper part of the valve box and secured to the other end of the toggle joint, an adjustable stop in the upper part of the valve box and arranged to limit the deformation of the toggle joint in one sense, and means between said float and said stub shaft to close said valve when the float is lifted by the liquid, and to open said valve when the float goes down.

5. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in said valve box adapted to control said lateral orifice, a float box encased from above in the top of the tank, a float in this float box arranged to be actuated by the liquid, a central rod secured to said valve, a stationary guide in the valve box coaxial with said lateral orifice, a cylinder in this guide and in which are pierced leakage holes, a piston slidingly mounted in this cylinder and secured to the valve rod, a spring in said cylinder arranged to act on the piston in the direction of the closing movement of the valve, the arrangement being such that the valve may be braked through the leakage holes, and means between said float and the central rod of the valve to close this latter when the float is lifted by the liquid, and to open the valve when the float goes down.

6. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in said valve box adapted to control said lateral orifice, a float box encased from above in the top of the tank, a float in this box arranged to be actuated by the liquid, a central rod secured to the valve, a stationary guide in the valve box coaxial with said lateral orifice and in which said rod is slidingly mounted, a bell integral with said guide and the open side of which is turned towards the lateral orifice, this bell being arranged to house the valve when it is completely open, and means between the float and the valve to close this latter when the float is lifted by the liquid, and to open the valve when the float goes down.

7. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in the box adapted to control said lateral orifice, a float box encased from above in the top of the tank, a float in this box arranged to be actuated by the liquid, a peripheral flange surrounding the float box, placed at an intermediate level of the height and adapted to be secured to the outer side of the tank, and means between the float and the valve to close this valve when the float is lifted by the liquid, and to open the valve when the float goes down.

8. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in this box adapted to control said lateral orifice, a float box encased from above in the top of the tank, an annular float in this float box arranged to be actuated by the liquid, means between said float and the valve to close this latter when the float is lifted by the liquid, and to open the valve when the float goes down, a safety valve arranged to seat on the top of the float box and to close an orifice provided in the top, a cylindrical pit secured to the lower face of the safety valve and on the periphery of which the annular float is slidingly mounted in the axial direction, a bell-shaped float slidingly guided in said pit and placed at a higher level that the annular float, and a ventilating valve mounted on the top of the bell-shaped float and adapted to control a ventilating orifice provided in the safety valve.

9. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in this box adapted to control said lateral orifice, a float box encased from above in the top of the tank, a float in this box arranged to be actuated by the liquid, means between the float and the valve to close this latter when the float is lifted by the liquid, and to open this valve when the float goes down, a safety valve arranged to seat on the top of the float box and to close an orifice provided in this top, a cover secured on the float box and arranged to cover said safety valve, and a lateral nozzle on this cover for draining the over-flow of the tank when the safety valve is open.

10. An automatic valve system for filling and emptying liquid tanks, comprising in combination a valve box encased from below in the bottom of a tank, a coupling nozzle on this box projecting to the outside of the tank, a lateral orifice in this box communicating with the inside of the tank, a valve in this box adapted to control said lateral orifice, a float box encased from above in the top of the tank, a float in this box arranged to be actuated by the liquid, a rod of adjustable length secured to the float and descending from this float, and means between this rod and said valve to close this latter when the float is lifted by the liquid, and to open said valve when the float goes down.

11. An automatic valve system for filling and emptying liquid tanks, comprising in combination a valve box encased from below in the bottom of the tank, a coupling nozzle on this box projecting to the outside of the tank, a lateral orifice in this box communicating with the inside of the tank, a valve in this box adapted to control said lateral orifice, a float box encased from above in the top of the tank, a float in this box arranged to be actuated by the liquid, means between this float and the valve of the lateral orifice to close this valve when the float is lifted by the liquid, and to open said valve when the float goes down, a protecting cap adapted to engage the coupling nozzle, a valve in this cap arranged to be pressed against the end of the nozzle, and means to tighten this valve against the nozzle.

JACQUES MULLER.

REFERENCES CITED

The following references are of record in the file of this patent:

UNITED STATES PATENTS

| Number | Name | Date |
| --- | --- | --- |
| 1,144,642 | Corbin | June 29, 1915 |
| 1,380,321 | Leibold | May 31, 1921 |
| 1,710,876 | Jaeger | Apr. 30, 1929 |
| 2,477,186 | Koehler | July 26, 1949 |